(12) United States Patent
Lin (10) Patent No.: US 8,094,421 B2
(45) Date of Patent: Jan. 10, 2012

(54) CURRENT-PERPENDICULAR-TO-PLANE (CPP) READ SENSOR WITH MULTIPLE REFERENCE LAYERS

(75) Inventor: Tsann Lin, Saratoga, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 1048 days.

(21) Appl. No.: 11/964,673

(22) Filed: Dec. 26, 2007

(65) Prior Publication Data

US 2009/0168267 A1 Jul. 2, 2009

(51) Int. Cl.
*G11B 5/39* (2006.01)
(52) U.S. Cl. .................. 360/324.2; 360/324.11
(58) Field of Classification Search ............. 360/324.2, 360/324.11
See application file for complete search history.

(56) References Cited

U.S. PATENT DOCUMENTS

| | | | |
|---|---|---|---|
| 5,862,022 | A | 1/1999 | Noguchi et al. |
| 6,472,048 | B1 | 10/2002 | Kakihara |
| 6,597,547 | B1 | 7/2003 | Kawawake et al. |
| 6,727,105 | B1 | 4/2004 | Brug et al. |
| 6,735,058 | B2 | 5/2004 | Lin et al. |
| 6,780,524 | B2 | 8/2004 | Lin et al. |
| 6,928,724 | B2 | 8/2005 | Hashimoto et al. |
| 6,937,448 | B2 | 8/2005 | Lee et al. |
| 2001/0055184 | A1 | 12/2001 | Shimazawa et al. |
| 2003/0128483 | A1 | 7/2003 | Kamijo |
| 2004/0264070 | A1 | 12/2004 | Lee et al. |
| 2005/0180059 | A1* | 8/2005 | Gill ................ 360/324.11 |
| 2006/0092578 | A1 | 5/2006 | Zhao et al. |
| 2006/0098354 | A1* | 5/2006 | Parkin ................ 360/324.2 |
| 2006/0168797 | A1 | 8/2006 | Li et al. |
| 2006/0187590 | A1 | 8/2006 | Lin |
| 2006/0193089 | A1 | 8/2006 | Li et al. |
| 2006/0198059 | A1 | 9/2006 | Sakai et al. |
| 2007/0008762 | A1 | 1/2007 | Lin |
| 2007/0015293 | A1 | 1/2007 | Wang et al. |
| 2007/0047159 | A1* | 3/2007 | Zhao et al. .......... 360/324.12 |
| 2007/0064352 | A1 | 3/2007 | Gill |
| 2008/0080101 | A1* | 4/2008 | Mauri et al. .......... 360/324.2 |
| 2008/0124581 | A1* | 5/2008 | Miura et al. ............. 428/811.1 |
| 2008/0179699 | A1* | 7/2008 | Horng et al. ............. 257/421 |

(Continued)

OTHER PUBLICATIONS

Sharif et al, "Thermal stability of Ir-Mn/Co-Fe-B/Al-O/Co-Fe-B tunnel junctions", Dec. 2005, Journal of Applied Physics, v. 98, issue 11, pp. 113710-113710-4.*

(Continued)

*Primary Examiner* — Julie Anne Watko
(74) *Attorney, Agent, or Firm* — Duft Bornsen & Fishman, LLP (57) ABSTRACT

A current-to-perpendicular-to-plane (CPP) read sensor with multiple reference layers and associated fabrication methods are disclosed. According to one embodiment of the invention, the multiple reference layers of a CPP tunneling magnetoresistance (TMR) read sensor includes a first reference layer formed by a ferromagnetic polycrystalline Co—Fe film, a second reference layer formed by a ferromagnetic substitute-type amorphous Co—Fe—X film where X is Hf, Zr or Y, and a third reference layer formed by a ferromagnetic interstitial-type amorphous Co—Fe—B film. The first reference layer facilitates the CPP TMR read sensor to exhibit high exchange and antiparallel-coupling fields. The second reference layer provides a thermally stable flat surface, thus facilitating the CPP TMR read sensor to exhibit a low ferromagnetic-coupling field. The multiple reference layers may induce spin-dependent scattering, thus facilitating the CPP TMR sensor to exhibit a high TMR coefficient.

16 Claims, 8 Drawing Sheets

U.S. PATENT DOCUMENTS

| | | | | |
|---|---|---|---|---|
| 2008/0217710 | A1* | 9/2008 | Horng et al. | 257/421 |
| 2008/0232003 | A1* | 9/2008 | Ibusuki et al. | 360/324.11 |
| 2009/0296286 | A1* | 12/2009 | Lin | 360/324.2 |
| 2010/0258889 | A1* | 10/2010 | Horng et al. | 257/421 |

OTHER PUBLICATIONS

"GMR, The Giant Magnetoresistive Head: A giant leap for IBM Research", http://www.research.ibm.com/research/gmr.html (Mar. 27, 2007).

Nakajima et al., "Effect of plasma treatment on the GMR properties of PtMn-based synthetic spin-valves", 46th Conference on Magnetism & Magnetic Materials, (Nov. 2001).

Simmons et al., "High-Pinning Iridium-Manganese-Chromium (IrMnCr) Read Sensors for High Reliability & Stability" http://www.hitachigst.com (2006).

Hayakawa et al., "Effect of high annealing temperature on giant tunnel magnetoresistance ratio of CoFeB/MgO/CoFeB magnetic tunnel junctions", Applied Physics Letter 89, 232510 (2006).

Cardoso et al., "Double-barrier magnetic tunnel junctions with GeSbTe thermal barriers for improved thermally assisted magnetoresistive random access memory cells", Journal of Applied Physics 99, 08N901 (2006).

Devasahayam et al., "Comparison of RF Bias, Gas Cluster Ion Beam, and Ion Beam In-Situ Beam Treatment for Enhancement of GMR in Spin-Valve Stacks", IEEE Transactions on Magnetics, vol. 40, No. 4, pp. 2200-2202 (Jul. 2004).

Shim et al., "Effect of nitrogen plasma treatment at the Al2O3/Fe interface in magnetic tunnel junction", Journal of Applied Physics, vol. 93, No. 10, pp. 7026-7028 (May 2003).

Lee et al., "Giant tunnel magnetoresistance and high annealing stability in CoFeB/MgO/CoFeB magnetic tunnel junctions with synthetic pinned layer".

Nozawa et al., "Surface flattening process of ultra-thin metal films and its effect on TMR properties of magnetic tunnel junctions", Record of Electrical and Communications Engineering, vol. 74, No. 1, pp. 389-390 (Feb. 2006).

* cited by examiner

CURRENT-PERPENDICULAR-TO-PLANE (CPP) READ SENSOR WITH MULTIPLE REFERENCE LAYERS

BACKGROUND OF THE INVENTION

1. Field of the Invention

The invention is related to the field of magnetic storage systems, and in particular, to a disk drive including a current-perpendicular-to-plane (CPP) read sensor with multiple reference layers.

2. Statement of the Problem

In many magnetic storage systems, a hard disk drive is the most extensively used to store data. The hard disk drive typically includes a hard disk along with an assembly of write and read heads. The assembly of write and read heads is supported by a slider that is mounted on a suspension arm. When the hard disk rotates, an actuator swings the suspension arm to place the slider over selected circular data tracks on the surface of the rotating hard disk. An air flow generated by the rotation of the hard disk causes the slider with an air bearing surface (ABS) to fly on a cushion of air at a particular height over the rotating hard disk. The height depends on the shape of the ABS. As the slider flies on the air bearing, the actuator moves the suspension arm to position the write and read heads over selected data tracks on the surface of the hard disk. The write and read heads thus write data to and read data from, respectively, a recording medium on the rotating hard disk. Processing circuitry connected to the write and read heads then operates according to a computer program to implement writing and reading functions.

In a reading process, the read head passes over transitions of a data track in the magnetic medium, and magnetic fields emitting from the transitions modulate the resistance of a read sensor in the read head. Changes in the resistance of the read sensor are detected by a sense current passing through the read sensor, and are then converted into voltage changes that generate read signals. The resulting read signals are used to decode data encoded in the transitions of the data track.

In a typical read head, a current-perpendicular-to-plane (CPP) giant magnetoresistance (GMR) or tunneling magnetoresistance (TMR) read sensor is electrically separated by side oxide layers from longitudinal bias layers in two side regions for preventing a sense current from shunting into the two side regions, but is electrically connected with lower and upper shields for the sense current to flow in a direction perpendicular to the sensor plane. A typical CPP GMR read sensor comprises an electrically conducting spacer layer sandwiched between lower and upper sensor stacks. The spacer layer is typically formed by a nonmagnetic Cu or oxygen-doped Cu (Cu—O) film having a thickness ranging from 1.6 to 4 nanometers. When the sense current flows across the Cu or Cu—O spacer layer, changes in the resistance of the CPP GMR read sensor is detected through a GMR effect. A typical CPP TMR read sensor comprises an electrically insulating barrier layer sandwiched between the lower and upper sensor stacks. The barrier layer is typically formed by a nonmagnetic oxygen-doped Mg (Mg—O) or Mg oxide ($MgO_X$) film having a thickness ranging from 0.4 to 1 nanometers. When the sense current "quantum-jumps" across the Mg—O or $MgO_X$ barrier layer, changes in the resistance of the CPP GMR read sensor is detected through a TMR effect.

The lower sensor stack comprises nonmagnetic seed layers, an antiferromagnetic pinning layer, a ferromagnetic keeper layer, a nonmagnetic antiparallel-coupling layer, and a ferromagnetic reference layer. The upper sensor stack comprises ferromagnetic sense (free) layers and a nonmagnetic cap layer. In the lower sensor stack, the keeper layer, the antiparallel-coupling layer, and the reference layer form a flux-closure structure where four fields are induced. First, a unidirectional anisotropy field ($H_{UA}$) is induced by exchange coupling between the antiferromagnetic pinning layer and the keeper layer. Second, an antiparallel-coupling field ($H_{APC}$) is induced by antiparallel coupling between the keeper layer and the reference layer across the antiparallel-coupling layer. Third, a demagnetizing field ($H_D$) is induced by the net magnetization of the keeper layer and the reference layer. Fourth, a ferromagnetic-coupling field ($H_F$) is induced by ferromagnetic coupling between the reference layer and the sense layer across the spacer or barrier layer. To ensure proper sensor operation, $H_{UA}$ and $H_{APC}$ should be high enough to rigidly pin magnetizations of the keeper layer and the reference layer in opposite transverse directions perpendicular to the ABS, while $H_D$ and $H_F$ should be small and balance with each other to orient the magnetization of the sense layers in a longitudinal direction parallel to the ABS.

In the flux-closure structure of the CPP TMR read sensor, the Co—Fe keeper layer is selected to ensure high exchange and antiparallel coupling. Its composition is optimized and its magnetic moment is small, so that high $H_{UA}$ and $H_{APC}$ can be attained. The Co—Fe—B reference layer is selected to ensure a strong TMR effect and mild ferromagnetic coupling. Its B content is high enough for B atoms, which are much smaller than Co and Fe atoms, to occupy interstitial sites of a crystalline structure and thus interfere with the ability of the Co and Fe atoms to crystallize. As a result, an interstitial-type amorphous film with a flat surface is formed, which facilitates the Mg—O or $MgO_X$ barrier layer to grow with a preferred <001> crystalline texture on the flat surface, thus increasing a TMR coefficient ($\Delta R_T/R_J$) and decreasing $H_F$. Its Co and Fe contents are optimized and its magnetic moment is small, so that a high $H_{APC}$ can be attained.

The use of the Co—Fe—B reference layer in the prior art generally meets the requirements of high $H_{APC}$, low $H_F$, and high $\Delta R_T/R_J$. However, it is still desirable to further improve the reference layer for the CPP TMR sensor to operate more robustly.

SUMMARY

Embodiments of the invention include a CPP read sensor with multiple reference layers. According to one embodiment, the multiple reference layers of a CPP TMR read sensor include a first reference layer formed by a ferromagnetic polycrystalline Co—Fe film, a second reference layer formed by a ferromagnetic substitute-type amorphous Co—Fe—X film where X is Zr, Hf or Y, and a third reference layer formed by a ferromagnetic interstitial-type amorphous Co—Fe—B film. The first reference layer facilitates the TMR sensor to exhibit high exchange and antiparallel-coupling fields. The second reference layer provides a thermally stable flat surface, thus facilitating the CPP TMR sensor to exhibit a low ferromagnetic-coupling field. The multiple reference layers induce spin-dependent scattering, thus facilitating the CPP TMR sensor to exhibit a high TMR coefficient.

The invention may include other exemplary embodiments as described below.

DESCRIPTION OF THE DRAWINGS

The same reference number represents the same element or same type of element on all drawings.

DETAILED DESCRIPTION OF THE INVENTION

FIGS. 1-11 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
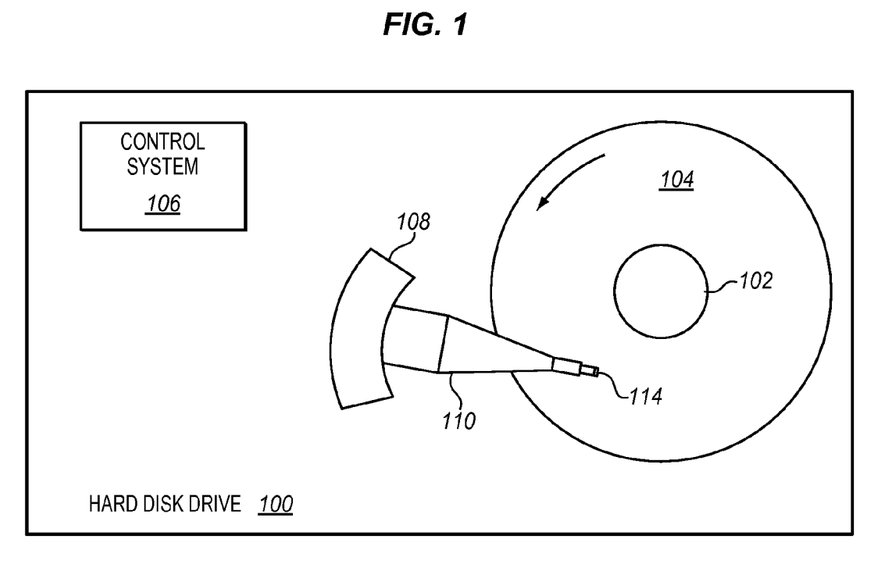
FIG. 1 illustrates a hard disk drive used as a magnetic storage system.

FIG. 1 illustrates a hard disk drive 100 used as a magnetic storage system. The hard disk drive 100 includes a spindle 102, a hard disk 104, a control system 106, an actuator 108, a suspension arm 110, and a slider 114 having an assembly of write and read heads. The spindle 102 supports and rotates the hard disk 104 in a direction indicated by the arrow. A spindle motor (not shown) rotates the spindle 102 according to control signals from the control system 106. The slider 114 is supported by the suspension arm 110, and the actuator 108 is configured to rotate the suspension arm 110 in order to position the assembly of write and read heads over a desired data track in a magnetic medium on the hard disk 104. The hard disk drive 100 may include other components not shown in FIG. 1, such as a plurality of hard disks, actuators, suspension arms, and sliders.

When the hard disk 104 rotates, an air flow generated by the rotation of the hard disk 104 causes the slider 114 with an air bearing surface (ABS) to fly on a cushion of air at a particular height over the rotating hard disk 104. The height depends on the shape of the ABS. As the slider 114 flies on the air, the actuator 108 moves the suspension arm 110 to position a write head (not shown) and a read head (not shown) over selected data tracks on the surface of the hard disk 104. The write and read heads write data to and read data from, respectively, a recording medium on the rotating hard disk 104. Processing circuitry connected to the write and read heads then operates according to a computer program to implement writing and reading functions.

Figure 2:
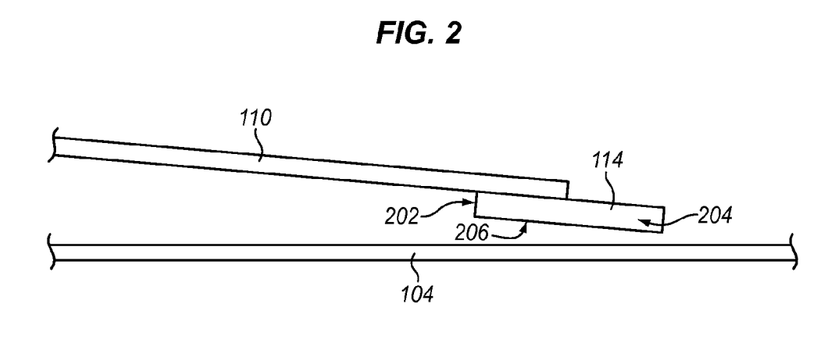
FIG. 2 is a side view of a hard disk drive.

FIG. 2 is a side view of hard disk drive 100. The slider 114 is supported above the surface of the hard disk 104. The slider 114 includes a front end 202 and an opposing trailing end 204. The slider 114 also includes an air bearing surface 206 that faces toward the surface of the hard disk 104. A write head (not shown) and a read head (not shown) are formed proximate to the trailing end 204, which is further illustrated in FIG. 3.

Figure 3:
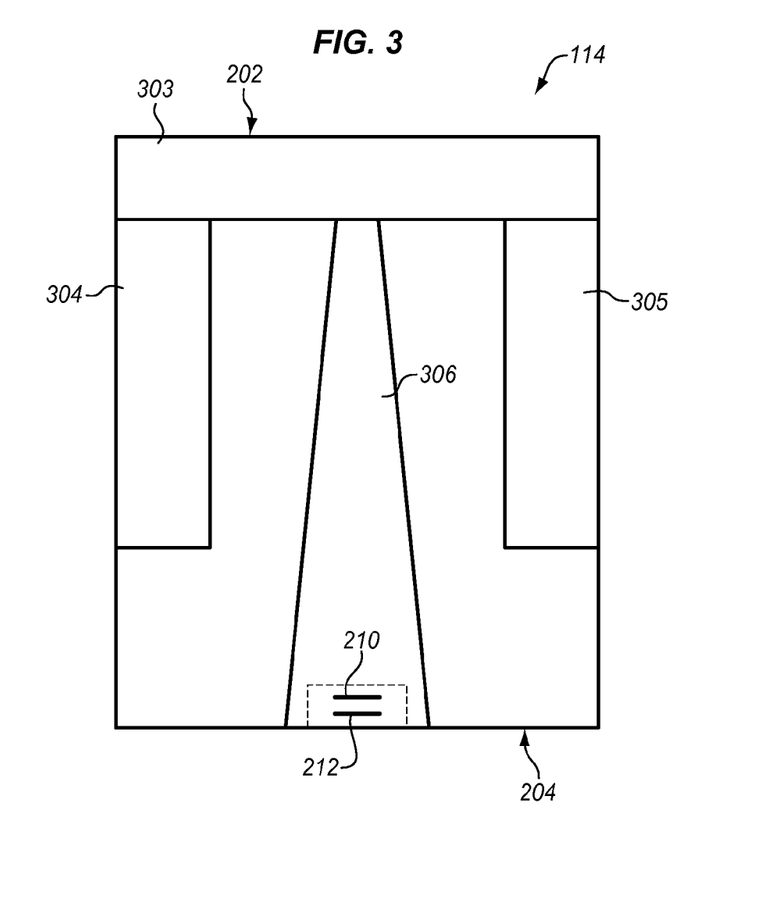
FIG. 3 is an ABS view of a slider.

FIG. 3 is an ABS view of slider 114. The ABS 206 of slider 114 is the surface of the page in FIG. 3. The slider 114 has a cross rail 303, two side rails 304, 305, and a center rail 306 on the ABS 206. The rails, which define how the slider 114 flies over the surface of the hard disk 104, illustrate just one embodiment, and the configuration of the ABS 206 of the slider 114 may take on any desired form. The slider 114 includes a write head 210 and a read head 112 fabricated proximate to the trailing end 204.

Figure 4:
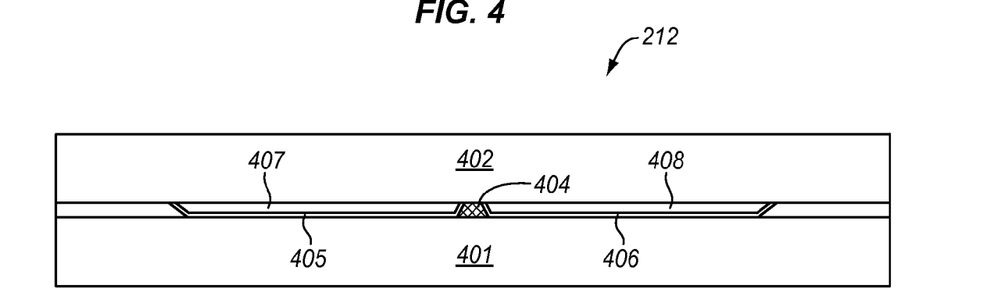
FIG. 4 illustrates an ABS view of a typical read head fabricated on a slider.

FIG. 4 illustrates an ABS view of a typical read head 212 fabricated on the slider 116. The read head 212 includes a first (lower) shield 401 and a second (upper) shield 402 that sandwich a TMR read sensor 404 and two side regions at edges of the TMR read sensor 404. In the two side regions, side oxide layers 405-406 separate longitudinal bias layers 407-408, respectively, from the first shield 401 and the TMR read sensor 404.

Figure 5:
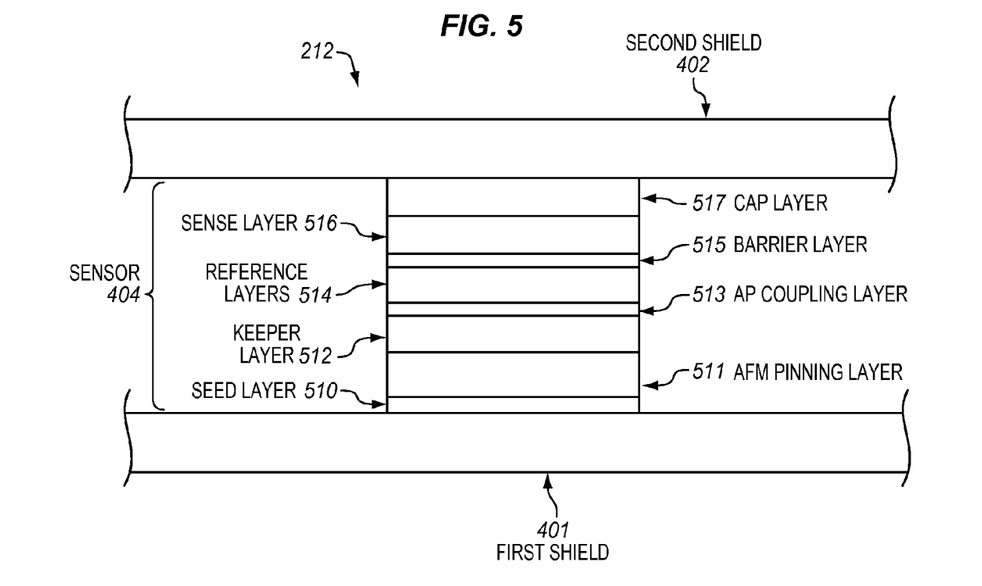
FIG. 5 illustrates an ABS view of a TMR read sensor in an exemplary embodiment of the invention.

FIG. 5 illustrates an ABS view of a TMR read sensor 404 in an exemplary embodiment of the invention. The layers 511-517 shown for the TMR read sensor 404 illustrate just one embodiment, and the TMR read sensor 404 may include additional layers or different layers in other embodiments. The TMR read sensor 404 includes an electrically insulating barrier layer 515 sandwiched between a lower sensor stack and an upper sensor stack. The lower sensor stack includes one or more nonmagnetic seed layers 510, an antiferromagnetic pinning layer 511, a ferromagnetic keeper layer 512, an antiparallel-coupling layer 513, and multiple reference layers 514. The upper sensor stack includes one or more ferromagnetic sense layers 516, and a nonmagnetic cap layer 517.

Figure 6:
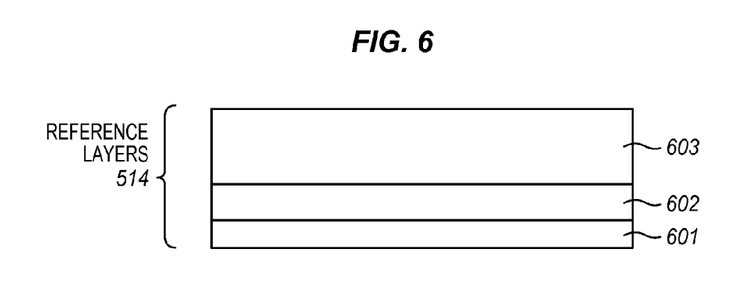
FIG. 6 illustrates multiple reference layers in an exemplary embodiment of the invention.

FIG. 6 illustrates multiple reference layers 514 in an exemplary embodiment of the invention. The multiple reference layers 514 include a first reference layer 601 formed by a ferromagnetic polycrystalline Co—Fe film. The first reference layer 601 may be formed by a Co—Fe film including Co with a content ranging from 50 to 90 at % and Fe with a content ranging from 10 to 50 at %, and having a thickness ranging from 0.2 to 1 nanometers. The multiple reference layers 514 further include the second reference layer 602 formed by a ferromagnetic substitute-type amorphous Co—Fe—X (where X is Zr, Hf or Y) film. The second reference layer 602 may be formed by a Co—Fe—X film including Co with a content ranging from 60 to 80 at %, Fe with a content ranging from 0 to 40 at %, and X with a content ranging from 6 to 30 at %, where X is Hf, Zr, or Y, and having a thickness ranging from 0.6 to 2 nanometers. The substitute-type amorphous film is formed by adding Zr, Hf or Y atoms, which are much larger than Co and Fe atoms, to occupy substitute sites of a crystalline structure and thus to interfere with the ability of the Co and Fe atoms to crystallize. The multiple reference layers 514 further include a third reference layer 603 formed by a ferromagnetic interstitial-type amorphous Co—Fe—B film. The third reference layer 603 may be formed by a Co—Fe—B film including Co with a content ranging from 60 to 80 at %, Fe with a content ranging from 0 to 40 at %, and B with a content ranging from 6 to 30 at %, and having a thickness ranging from 1 to 2 nanometers. The interstitial-type amorphous film is formed by adding B atoms, which are much smaller than Co and Fe atoms, to occupy interstitial sites of a crystalline structure and thus to interfere with the ability of the Co and Fe atoms to crystallize.

Although FIG. 5 illustrates a TMR read sensor, those skilled in the art will appreciate that that the concept of multiple reference layers as described in FIG. 6 may also apply to other CPP read sensors, such as a CPP GMR read sensor. In a CPP GMR read sensor, a nonmagnetic spacer layer replaces the barrier layer 515 in the CPP GMR lower and upper sensor stacks.

Figure 7:
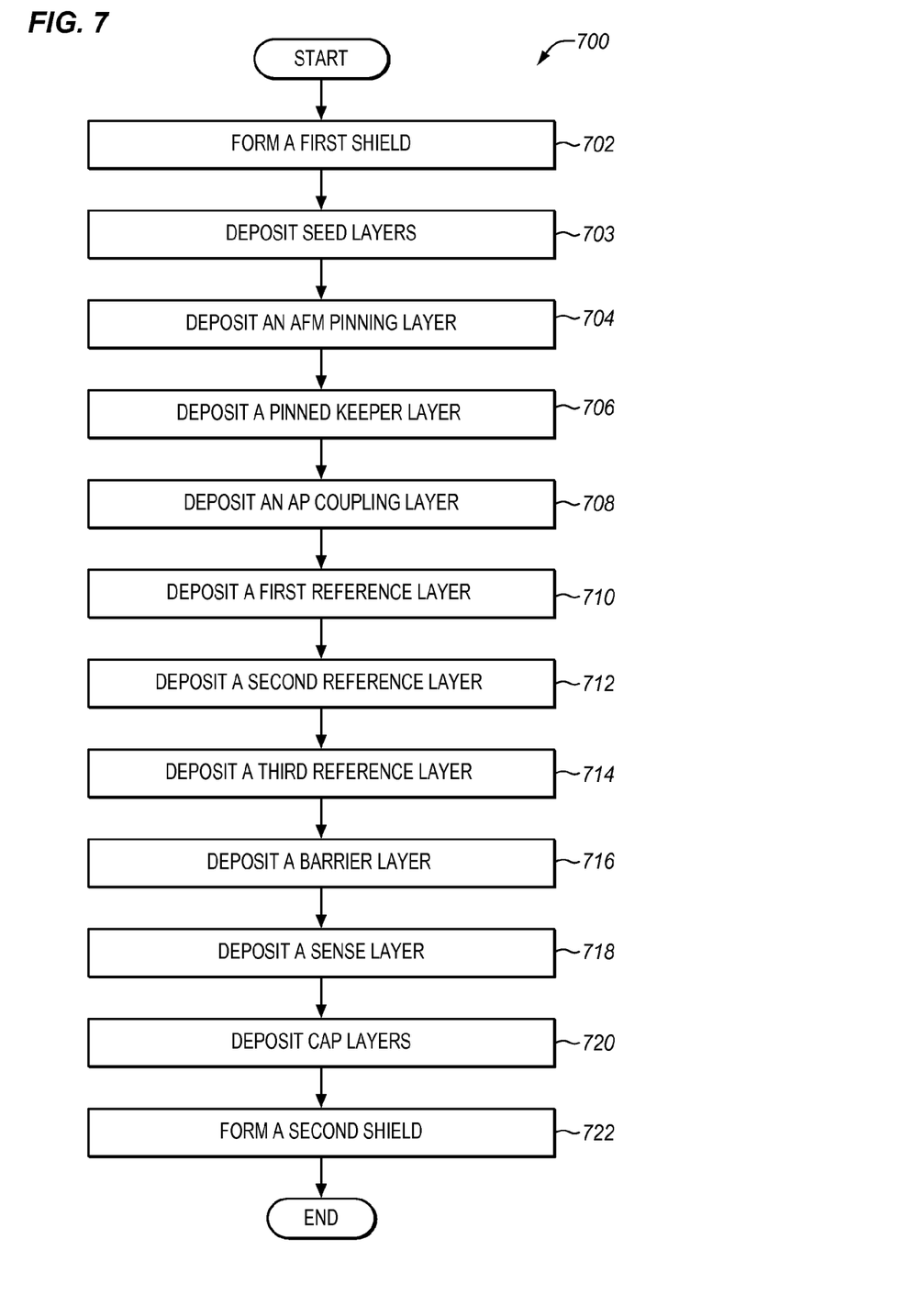
FIG. 7 is a flow chart illustrating a method of fabricating a TMR read sensor in an exemplary embodiment of the invention.

FIG. 7 is a flow chart illustrating a method 700 of fabricating the TMR read sensor 404 in an exemplary embodiment of the invention. The steps of the flow chart in FIG. 7 are not all inclusive and may include other steps not shown. Step 702 comprises forming a first or lower ferromagnetic shield 401 on a wafer. The wafer is then smoothened with chemical mechanical polishing (CMP) in order for the lower shield 401 to provide a smooth surface for the TMR read sensor to grow. Step 703 comprises depositing one or more nonmagnetic seed layers 510 on the lower shield 401. Step 704 comprises depositing an antiferromagnetic pinning layer 511 on the seed layers 510. The term "on" as used herein may refer to being deposited directly on top of a previously deposited film. Step 706 comprises depositing a ferromagnetic keeper layer 512 on the antiferromagnetic pinning layer 511. Step 708 comprises depositing a nonmagnetic antiparallel coupling layer 513 on the keeper layer 512. Step 710 comprises depositing the first reference layer 601 on the antiparallel coupling layer 513. Step 712 comprises depositing the second reference layer 602 on the first reference layer 601. Step 714 comprises depositing the third reference layer 603 on the second reference layer 602. Steps 710-714 may be performed in situ hi the same module of a sputtering system for improving processing efficiency and TMR properties. Step 716 comprises forming the barrier layer 515 on the third reference layer 603. Step 718 comprises depositing one or more sense layers 516 on the barrier layer 515. Step 720 comprises depositing a cap layer 517 on the sense layers 516. After patterning the TMR read sensor 404 and depositing side oxide and longitudinal bias layers into side regions of the TMR read sensor 404, step 722 is performed to form the second shield 402 on the cap layer 517.

Figure 8:
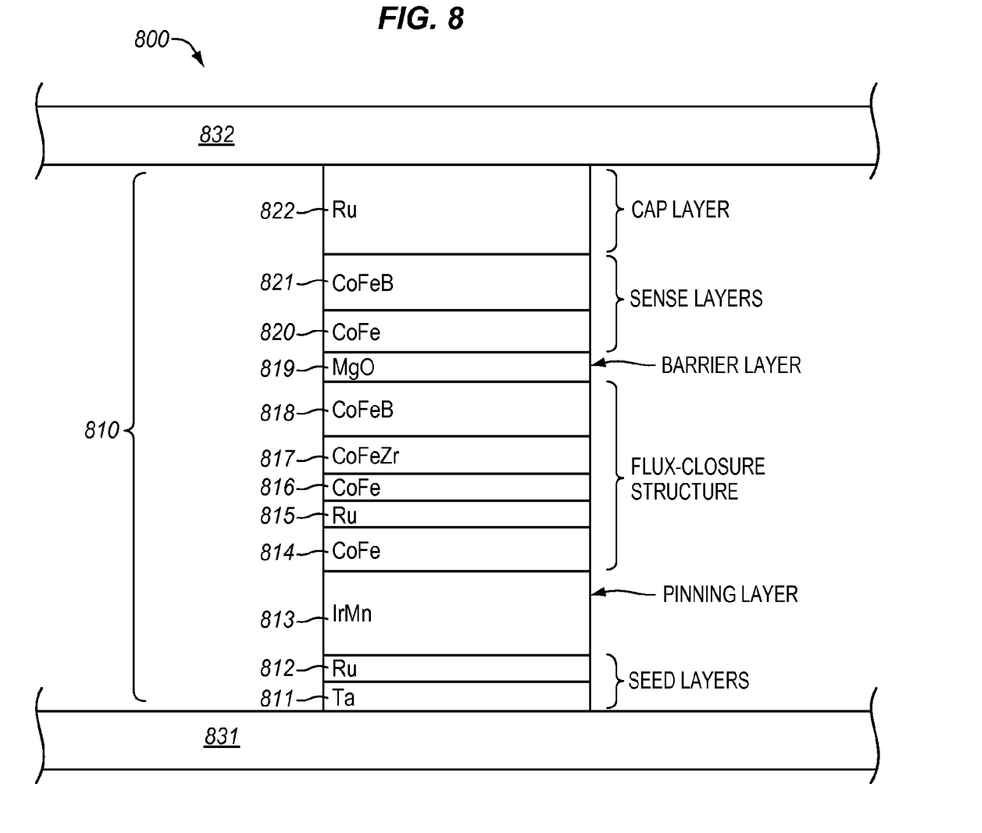
FIG. 8 illustrates an ABS view of the detailed structure of a TMR read sensor in an exemplary embodiment of the invention.

FIG. 8 illustrates an ABS view of the detailed structure of a TMR read head 800 in an exemplary embodiment of the invention. The TMR read head 800 is a detailed embodiment that is in no way intended to limit the scope of the invention, as exemplary layers of the TMR read head 800 are shown. Thus, those skilled in the art understand that the TMR read head 800 may include other layers hi other exemplary embodiments. In FIG. 8, the TMR read head 800 includes a TMR read sensor 810 sandwiched between a first or lower shield 831 formed by a 1 μm thick Ni—Fe film and a second or upper shield 832 formed by another 1 μm thick Ni—Fe film.

The TMR read sensor 810 includes an electrically insulating barrier layer 819 sandwiched between a lower sensor stack and an upper sensor stack. The barrier layer 819 may be formed by a nonmagnetic oxygen-doped Mg (Mg—O) film in-situ formed in only one module of a sputtering system, as described below. After heavily cleaning a Mg target for 60 seconds with a target power of 600 W, a 0.2 nanometer thick Mg film is DC sputtered in an argon gas of $3\times10^{-4}$ torr with a target power of 40 W. A first oxygen treatment in an oxygen gas of $5\times10^{-7}$ torr is then applied to the Mg film, resulting in oxygen doping into the Mg film. A 0.4 nanometer thick Mg—O film is then DC sputtered in a mixture of argon and oxygen gases of 3 and $0.4\times10^{-4}$ torr, respectively, with a target power of 100 W. A second oxygen treatment in an oxygen gas of $5\times10^{-7}$ torr is then applied to the Mg—O fihn. A 0.2 nanometer thick Mg—O film is then DC sputtered in a mixture of argon and oxygen gases of 3 and $0.1\times10^{-4}$ torr, respectively, with a target power of 100 W. A third oxygen treatment in an oxygen gas of $5\times10^{-5}$ torr is then applied to the Mg—O film.

The lower sensor stack comprises a first seed layer 811 formed by a 3 nanometer thick nonmagnetic Ta film, a second seed layer 812 formed by a 3 nanometer thick nonmagnetic Ru film, a pinning layer 813 formed by a 6 nanometer thick antiferromagnetic 21.7Ir-78.3Mn film (composition in atomic percent), a keeper layer 814 formed by a 2.1 nanometer thick ferromagnetic 77.5Co-22.5Fe film, and an antiparallel coupling layer 815 formed by a 0.8 nanometer thick nonmagnetic Ru film. The lower sensor stack further comprises a first reference layer 816 formed by a 0.4 nanometer thick ferromagnetic 77.5Co-22.5Fe film, a second reference layer 817 formed by a 0.6 nanometer thick ferromagnetic 64.6Co-19.7Fe-15.7Zr film, and a third reference layer 818 formed by a 1 nanometer thick ferromagnetic 51.9Co-34.6Fe-13.5B film.

The upper sensor stack comprises a first sense layer 820 formed by a 0.4 nanometer thick ferromagnetic 87.1Co-12.9Fe film, a second sense layer 821 formed by a 2.6 nanometer thick ferromagnetic 71.5Co-7.4Fe-21.1B film, and a cap layer 822 formed by a 6 nanometer thick nonmagnetic Ru film.

Figure 9:
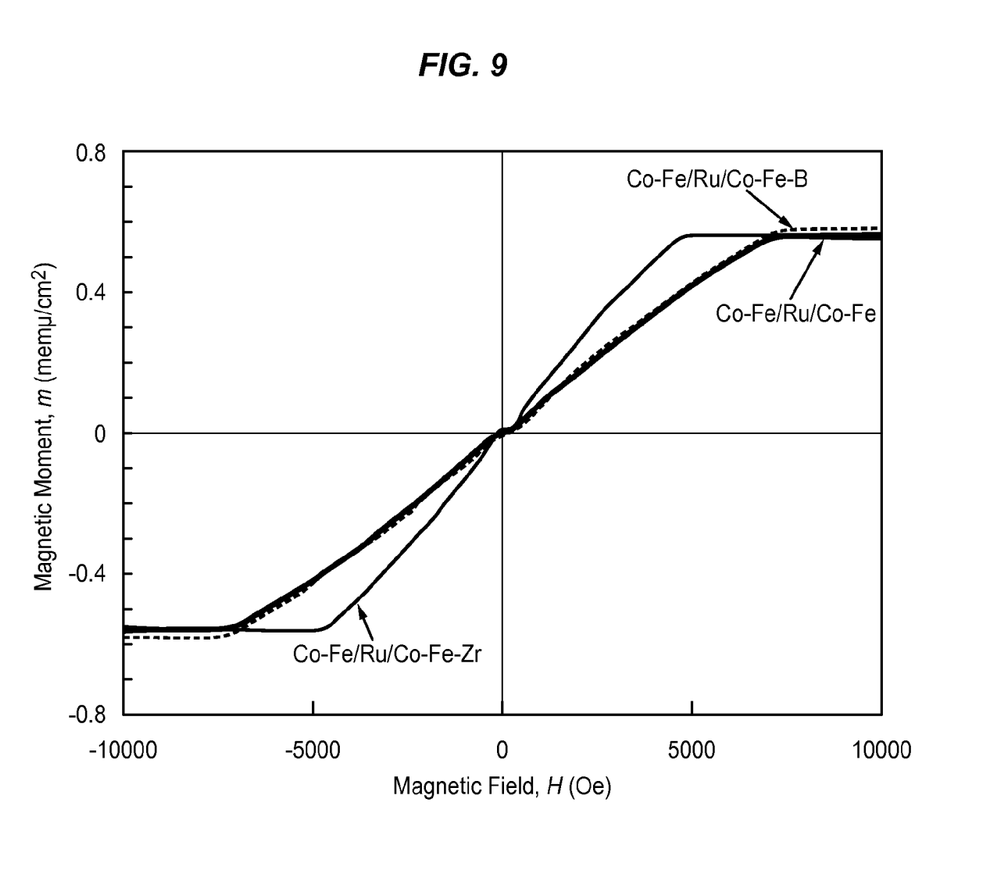
FIG. 9 illustrates magnetic responses of Ta(3)/Ru(3)/77.5Co-22.5Fe(2.1)/Ru(0.8)/X/Ta(3) films (thickness in nanometer), where X is 77.5Co-22.5Fe (2.1), 64.6Co-19.7Fe-15.7Zr (2.4), or 51.9Co-34.6Fe-13.5B (2.4) in an exemplary embodiment of the invention.

The first reference layer 816 facilitates the flux-closure structure to exhibit a high antiparallel-coupling field ($H_{APC}$), which is defined as a critical field aligning 95% of the saturation magnetization of the flux-closure structure in its direction. FIG. 9 illustrates magnetic responses of Ta(3)/Ru(3)/77.5Co-22.5Fe(2.1)/Ru(0.8)/X/Ta(3) films (thickness in nanometer), where X is 77.5Co-22.5Fe(2.1), 64.6Co-19.7Fe-15.7Zr (2.4) or 51.9Co-34.6Fe-13.5B (2.4). $H_{APC}$ values reach 6,299, 4,136 and 6,450 Oe for the Co—Fe(2.1), Co—Fe—Zr(2.4) and Co—Fe—B(2.4), respectively. The Co—Fe first reference layer 816 acts as a buffer layer to achieve a high $H_{APC}$. While the Co—Fe—B can also act as a buffer layer to achieve a litter higher $H_{APC}$, it is still suggested to use the Co—Fe first reference layer 816 but with a higher Fe content to achieve an even higher $H_{APC}$.

Figure 10:
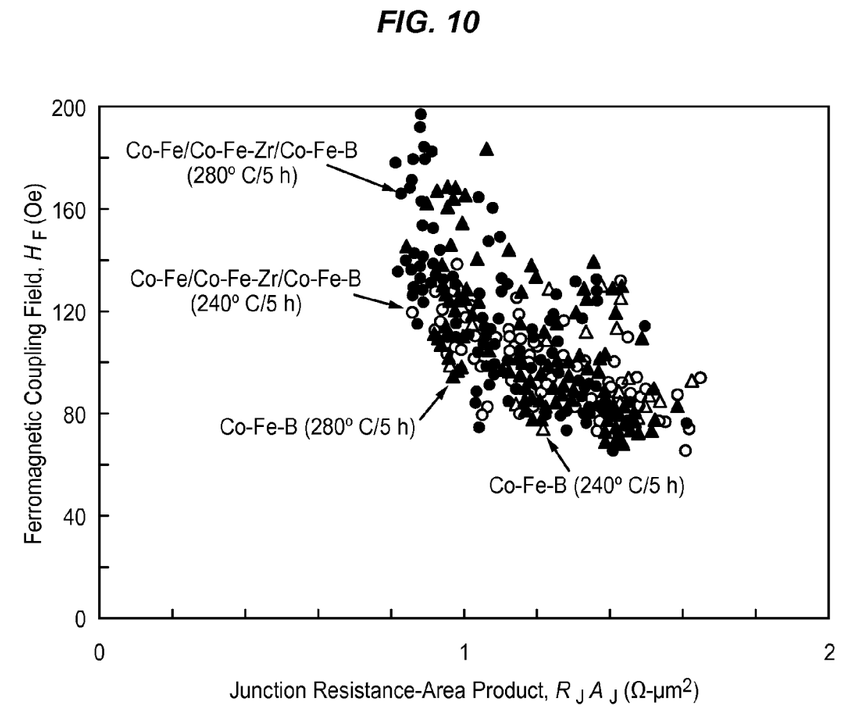
FIG. 10 illustrates the ferromagnetic coupling field ($H_F$) versus the resistance-area product ($R_J A_J$) for TMR read sensors in an exemplary embodiment of the invention.

The second reference layer 817 provides a thermally stable flat surface, thus facilitating the TMR read sensor 800 to exhibit a low ferromagnetic-coupling field ($H_F$). FIG. 10 illustrates the ferromagnetic coupling field ($H_F$) versus the resistance-area product ($R_J A_J$) for the TMR read sensors in an exemplary embodiment of the invention. After annealing for 5 hours at 240 and 280° C., the TMR read sensors with Co—Fe—B and Co—Fe/Co—Fe—Zr/Co—Fe—B reference layers exhibit comparable $H_F$, indicating that the Co—Fe—Zr second reference layer 817 plays the same role as the Co—Fe—B third reference layer 818 in facilitating the Mg—O film to grow as a flat barrier layer. In addition, it is found from cross-sectional transmission electron microscopy that, after annealing for 5 hours at 280° C., the substitute-type amorphous Co—Fe—Zr second reference layer 817 still remains as amorphous, while the interstitial-type amorphous Co—Fe—B third reference layer 818 becomes polycrystalline. It is thus expected that the substitute-type amorphous Co—Fe—Zr reference layer 817 might play a better role than the Co—Fe—B third reference layer 818 in facilitating the Mg—O film to grow as a flat barrier layer in the TMR read sensor annealed at even higher temperatures.

Figure 11:
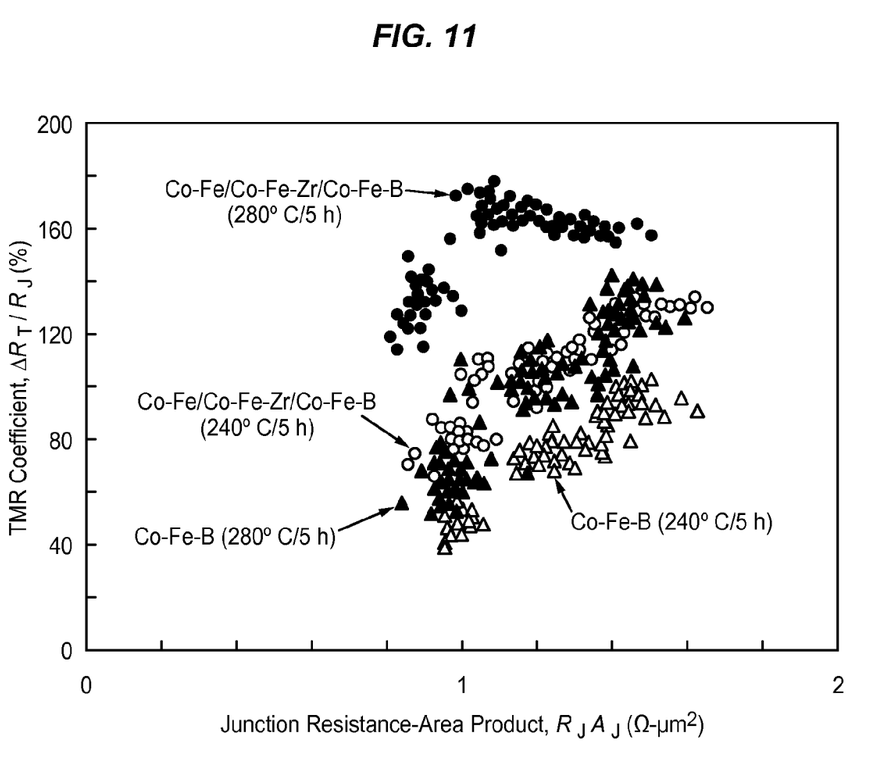
FIG. 11 illustrates the TMR coefficient ($\Delta R_T/R_J$) versus the resistance-area product ($R_J A_J$) for the TMR read sensors in an exemplary embodiment of the invention.

The multiple reference layers might induce spin-dependent scattering, thus facilitating the TMR read sensor 800 to exhibit a high TMR coefficient ($\Delta R_T/R_J$). FIG. 11 shows $\Delta R_T/R_J$ versus the resistance-area product ($R_J A_J$) for the TMR read sensors in an exemplary embodiment of the invention. After annealing for 5 hour at 240° C., the TMR read sensor with the Co—Fe/Co—Fe—Zr/Co—Fe—B reference layers exhibits $\Delta R_T/R_J$ higher than that with the Co—Fe—B reference layer. In addition, after annealing for 5 hour at 280° C., while $\Delta R_T/R_J$ for the TMR read sensor with the Co—Fe—B reference layer slightly increases, $\Delta R_T/R_J$ for the TMR read sensor with the Co—Fe/Co—Fe—Zr/Co—Fe—B reference layers substantially increases. It should be noted that the thickness of the Co—Fe—B reference layer in the prior art must be large enough to exhibit a high $\Delta R_T/R_J$, while that of the Co—Fe—B third reference layer in the exemplary embodiment of the invention is reduced by 50%, but an even higher $\Delta R_T/R_J$ is attained. The Co—Fe first reference layer and the Co—Fe—Zr second reference layer, as well as two newly created interfaces in the multiple reference layers, thus also play crucial roles in increasing $\Delta R_T/R_J$.

Although specific embodiments were described herein, the scope of the invention is not limited to those specific embodiments. The scope of the invention is defined by the following claims and any equivalents thereof.

I claim:

1. A flux-closure structure for a current-perpendicular-to-plane (CPP) read sensor, the flux-closure structure comprising:
    a keeper layer;
    an antiparallel coupling layer on the keeper layer; and
    multiple reference layers on the antiparallel coupling layer, the multiple reference layers comprising:
        a first reference layer formed by a ferromagnetic polycrystalline film on the antiparallel coupling layer;
        a second reference layer formed by a ferromagnetic substitute-type amorphous film on the first reference layer; and
        a third reference layer formed by a ferromagnetic interstitial-type amorphous film on the second reference layer.

2. The flux-closure structure of claim 1 wherein the first reference layer is formed by a Co—Fe film including Co with a content ranging from 50 to 90 at % and Fe with a content ranging from 10 to 50 at %, and having a thickness ranging from 0.2 to 1 nanometers.

3. The flux-closure structure of claim 1 wherein the second reference layer is formed by a Co—Fe—X film including Co with a content ranging from 60 to 80 at %, Fe with a content ranging from 0 to 40 at %, and X with a content ranging from 6 to 30 at %, where X is Hf, Zr or Y, and having a thickness ranging from 0.6 to 2 nanometers.

4. The flux-closure structure of claim 1 wherein the third reference layer is formed by a Co—Fe—B film including Co with a content ranging from 60 to 80 at %, Fe with a content ranging from 0 to 40 at %, and B with a content ranging from 6 to 30 at %, and having a thickness ranging from 1 to 2 nanometers.

5. A current-perpendicular-to-plane (CPP) read sensor, comprising:
    nonmagnetic seed layers;
    an antiferromagnetic pinning layer on the seed layers;
    a flux-closure structure on the antiferromagnetic pinning layer, wherein the flux-closure structure includes:
        a keeper layer;
        an antiparallel coupling layer on the keeper layer;
        multiple reference layers on the antiparallel coupling layer, the multiple reference layers comprising:
            a first reference layer formed by a ferromagnetic polycrystalline film on the antiparallel coupling layer;
            a second reference layer formed by a ferromagnetic substitute-type amorphous film on the first reference layer; and
            a third reference layer formed by a ferromagnetic interstitial-type amorphous film on the second reference layer;
    a nonmagnetic spacer or barrier layer on the flux-closure structure;
    ferromagnetic sense layers on the nonmagnetic spacer or barrier layer; and
    a nonmagnetic cap layer on the sense layers.

6. The CPP read sensor of claim 5 wherein the first reference layer is formed by a Co—Fe film including Co with a content ranging from 50 to 90 at % and Fe with a content ranging from 10 to 50 at %, and having a thickness ranging from 0.2 to 1 nanometers.

7. The CPP read sensor of claim 5 wherein the second reference layer is formed by a Co—Fe—X film including Co with a content ranging from 60 to 80 at %, Fe with a content ranging from 0 to 40 at %, and X with a content ranging from 6 to 30 at %, where X is Hf, Zr or Y, and having a thickness ranging from 0.6 to 2 nanometers.

8. The CPP read sensor of claim 5 wherein the third reference layer is formed by a Co—Fe—B film including Co with a content ranging from 60 to 80 at %, Fe with a content ranging from 0 to 40 at %, and B with a content ranging from 6 to 30 at %, and having a thickness ranging from 1 to 2 nanometers.

9. The CPP read sensor of claim 5 wherein the nonmagnetic spacer layer is formed by a nonmagnetic electrically conducting Cu or oxygen-doped Cu (Cu—O) film with a thickness ranging from 1.6 to 4 nanometers for detecting resistance changes through a giant magnetoresistance effect.

10. The CPP read sensor of claim 5 wherein the nonmagnetic barrier layer is formed by a nonmagnetic electrically insulating oxygen-doped Mg (Mg—O) or Mg oxide ($MgO_X$) film with a thickness ranging from 0.4 to 1 nanometers.

11. A hard disk drive, comprising:
    a hard disk; and
    a read head that includes a current-perpendicular-to-plane (CPP) read sensor for reading data from the hard disk, the CPP read sensor comprising:
        nonmagnetic seed layers;
        an antiferromagnetic pinning layer on the seed layers;
        a flux-closure structure on the antiferromagnetic pinning layer, wherein the flux-closure structure includes:
            a keeper layer;
            an antiparallel coupling layer on the keeper layer;
            multiple reference layers on the antiparallel coupling layer, the multiple reference layers comprising:
                a first reference layer formed by a ferromagnetic polycrystalline film on the antiparallel coupling layer;
                a second reference layer formed by a ferromagnetic substitute-type amorphous film on the first reference layer; and
                a third reference layer formed by a ferromagnetic interstitial-type amorphous film on the second reference layer;
        a nonmagnetic spacer or barrier layer on the flux-closure structure;
        ferromagnetic sense layers on the nonmagnetic spacer or barrier layer; and
        a nonmagnetic cap layer on the sense layers.

12. The hard disk drive of claim 11 wherein the first reference layer is formed by a Co—Fe film including Co with a content ranging from 50 to 90 at % and Fe with a content ranging from 10 to 50 at %, and having a thickness ranging from 0.2 to 1 nanometers.

13. The hard disk drive of claim 11 wherein the second reference layer is formed by a Co—Fe—X film including Co with a content ranging from 60 to 80 at %, Fe with a content ranging from 0 to 40 at %, and X with a content ranging from 6 to 30 at %, where X is Hf, Zr or Y, and Y, and having a thickness ranging from 0.6 to 2 nanometers.

14. The hard disk drive of claim 11 wherein the third reference layer is formed by a Co—Fe—B film including Co with a content ranging from 60 to 80 at %, Fe with a content ranging from 0 to 40 at %, and B with a content ranging from 6 to 30 at %, and having a thickness ranging from 1 to 2 nanometers.

15. A current-perpendicular-to-plane (CPP) read sensor, comprising:
   a keeper layer;
   an antiparallel coupling layer on the keeper layer;
   a first reference layer formed by a ferromagnetic polycrystalline film on the antiparallel coupling layer; and
   a second reference layer formed by a ferromagnetic amorphous film on the first reference layer.

16. The CPP read sensor of claim 15 wherein:
   the first reference layer is formed by a Co—Fe film;
   the second reference layer is formed by a Co—Fe—X film, where X is Zr, Hf or Y;
   a third reference layer is formed by a Co—Fe—B ferromagnetic amorphous film on the second reference layer.

* * * * *

UNITED STATES PATENT AND TRADEMARK OFFICE
CERTIFICATE OF CORRECTION

| | | |
|---|---|---|
| PATENT NO. | : 8,094,421 B2 | Page 1 of 1 |
| APPLICATION NO. | : 11/964673 | |
| DATED | : January 10, 2012 | |
| INVENTOR(S) | : Lin | |

It is certified that error appears in the above-identified patent and that said Letters Patent is hereby corrected as shown below:

In column 5 line 31, the text "Steps 710-714 may be performed in situ hi the" should read -- Steps 710-714 may be performed in situ in the --

In column 5 line 48, the text "head 800 may include other layers hi other" should read -- head 800 may include other layers in other --

In column 6 line 1, the text "applied to the Mg—O fihn" should read -- applied to the Mg—O film --

Signed and Sealed this
Twenty-eighth Day of February, 2012

David J. Kappos
*Director of the United States Patent and Trademark Office*